(12) United States Patent
Perron et al.

(10) Patent No.: US 9,381,659 B2
(45) Date of Patent: Jul. 5, 2016

(54) AUTOMATED APPARATUS FOR USE IN SELECTIVELY CUTTING SIDE WALLS OF A HONEYCOMB CORE

(71) Applicant: The Boeing Company, Seal Beach, CA (US)

(72) Inventors: Daniel J. Perron, Federal Way, WA (US); Stephen Moore, Renton, WA (US); Jeffrey Hayden Olberg, Federal Way, WA (US); Mark Alan Negley, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/254,500

(22) Filed: Apr. 16, 2014

(65) Prior Publication Data

US 2015/0298335 A1 Oct. 22, 2015

(51) Int. Cl.
*G06F 19/00* (2011.01)
*G05B 19/04* (2006.01)
*B26D 5/00* (2006.01)
*B26D 5/02* (2006.01)
*B26D 5/06* (2006.01)
*B26D 5/08* (2006.01)
*B26D 5/34* (2006.01)
*B26D 7/00* (2006.01)
*B26D 7/08* (2006.01)
*G05B 19/408* (2006.01)

(52) U.S. Cl.
CPC *B26D 5/007* (2013.01); *B26D 5/02* (2013.01); *B26D 5/06* (2013.01); *B26D 5/08* (2013.01); *B26D 5/086* (2013.01); *B26D 5/34* (2013.01); *B26D 7/0006* (2013.01); *B26D 7/086* (2013.01); *G05B 19/4083* (2013.01); *B26D 2210/00* (2013.01); *Y02P 90/265* (2015.11)

(58) Field of Classification Search
CPC .................................. B26D 5/007; B26D 5/02
USPC ........... 700/1, 56–66, 95–125, 131, 134, 135, 700/171, 173, 182, 183, 184, 190–194, 700/245–264
See application file for complete search history.

(56) References Cited

U.S. PATENT DOCUMENTS

| 5,953,232 | A | * | 9/1999 | Blaimschein | B26D 5/00 382/111 |
|---|---|---|---|---|---|
| 6,502,489 | B2 | * | 1/2003 | Gerent | B26D 5/00 700/134 |
| 2005/0209735 | A1 | * | 9/2005 | Groppe | B29C 70/32 700/245 |

(Continued)

FOREIGN PATENT DOCUMENTS

EP 0380513 B1 6/1997

OTHER PUBLICATIONS

EPO Extended Search Report for related application 15163691.7 dated Mar. 9, 2016; 6 pp.

*Primary Examiner* — Bhavesh V Amin
(74) *Attorney, Agent, or Firm* — Armstrong Teasdale LLP

(57) ABSTRACT

An automated apparatus for use in selectively cutting side walls of a honeycomb core is provided. The apparatus includes an end effector, a cutting tool coupled to the end effector, wherein the end effector is configured to position the cutting tool in an initial cutting position based on a schematic geometry of the honeycomb core. The automated apparatus also includes an adaptive vision system configured to direct the end effector to modify the initial cutting position based on an actual geometry of the honeycomb core acquired by the adaptive vision system.

20 Claims, 6 Drawing Sheets

(56) References Cited

U.S. PATENT DOCUMENTS

| | | | | |
|---|---|---|---|---|
| 2007/0277655 | A1* | 12/2007 | Kawai | B28B 11/12 83/13 |
| 2008/0027582 | A1* | 1/2008 | Obinata | B25J 13/082 700/260 |
| 2009/0250445 | A1 | 10/2009 | Yamaguchi et al. | |
| 2013/0014378 | A1* | 1/2013 | Miller | B29C 70/30 29/592 |
| 2013/0014889 | A1* | 1/2013 | Miller | B29C 33/3842 156/250 |
| 2013/0289766 | A1* | 10/2013 | Hafenrichter | B25J 9/02 700/245 |

* cited by examiner

AUTOMATED APPARATUS FOR USE IN SELECTIVELY CUTTING SIDE WALLS OF A HONEYCOMB CORE

BACKGROUND

The field of the present disclosure relates generally to honeycomb structures and, more specifically, to an apparatus and methods of automated cutting of side walls of honeycomb structures.

Honeycomb structures, also referred to as honeycomb cores, typically include a plurality of hexagonal cells shaped to a desired form. Honeycomb structures are typically manufactured from a thin, flat base material such as metal, paper, and/or composite materials. The flat base material is cut into narrow, elongated strips, which are folded or bent into contoured strips of semi-hexagonal peaks and troughs. For example, an elongated strip of a material may be scored at regularly spaced intervals. To form regular hexagonally shaped cells, the score lines are aligned substantially parallel with the ends of the strip and the material is folded along the score lines to an angle of 60° twice in one direction and then twice in the opposite direction in a continuously alternating sequence. The resulting folded strips are then joined together by adhesive, spot welding, brazing or other known joining methods to form a structure having a series of hexagonally shaped cells, thereby forming a flat honeycomb core structure.

At least some known aircraft assemblies implement honeycomb structures in acoustic panels of an engine nacelle for use in attenuating engine noise. Known acoustic panels for use in aircraft assemblies are generally large in size. Manufacturing a single, large acoustic panel generally requires coupling multiple honeycomb structures together. For example, to create acoustic panels of increasing size, a plurality of honeycomb structures are often spliced together by cutting separate honeycomb structures into a desired shape and contour, and adjoining the separate honeycomb structures at respective side wall flaps thereof. Generally, the honeycomb structures must be precisely cut such that the side wall flaps have a predetermined length. However, precisely cutting honeycomb structures is a time-consuming and laborious task. Moreover, variations in the honeycomb structures resulting from the honeycomb structure manufacturing process makes it difficult to ensure the side wall flaps are formed with the predetermined length.

BRIEF DESCRIPTION

In one aspect, an automated apparatus for use in selectively cutting side walls of a honeycomb core is provided. The apparatus includes an end effector, a cutting tool coupled to the end effector, wherein the end effector is configured to position the cutting tool in an initial cutting position based on a schematic geometry of the honeycomb core. The automated apparatus also includes an adaptive vision system configured to direct the end effector to modify the initial cutting position based on an actual geometry of the honeycomb core acquired by the adaptive vision system.

In another aspect, an end effector of an automated apparatus for use in selectively cutting side walls of a honeycomb core is provided. The end effector includes a cutting tool coupled to the end effector, wherein the end effector is configured to position the cutting tool in an initial cutting position based on a schematic geometry of the honeycomb core. The end effector also includes an adaptive vision system configured to direct the end effector to modify the initial cutting position based on an actual geometry of the honeycomb core acquired by the adaptive vision system.

In yet another aspect, a method of selectively cutting side walls of a honeycomb core is provided. The side walls are selectively cut using an automated apparatus including a cutting tool and an adaptive vision system. The method includes positioning the cutting tool in an initial cutting position based on a schematic geometry of the honeycomb core, acquiring an actual geometry of the honeycomb core with the adaptive vision system, and modifying the initial cutting position of the cutting tool based on the actual geometry of the honeycomb core acquired by the adaptive vision system.

DETAILED DESCRIPTION

The implementations described herein relate to an automated apparatus for use in selectively cutting side walls of a honeycomb core. In the exemplary implementation, the automated apparatus includes a cutting tool and an adaptive vision system that facilitates modifying a predetermined tool path of the cutting tool relative to the honeycomb core. Specifically, the predetermined tool path for the cutting tool is programmed to determine a plurality of initial cutting positions along a schematic geometry of the honeycomb core. The predetermined tool path is selected to form a honeycomb core having a desired geometry. Because manufacturing honeycomb cores may be an imprecise process, a core cell offset between the schematic geometry and an actual geometry of the honeycomb core will reduce the likelihood of a honeycomb core cut along the predetermined tool path from substantially matching the desired geometry. As such, the adaptive vision system facilitates modifying the initial cutting positions to more accurately cut side walls of the honeycomb core.

Figure 1:
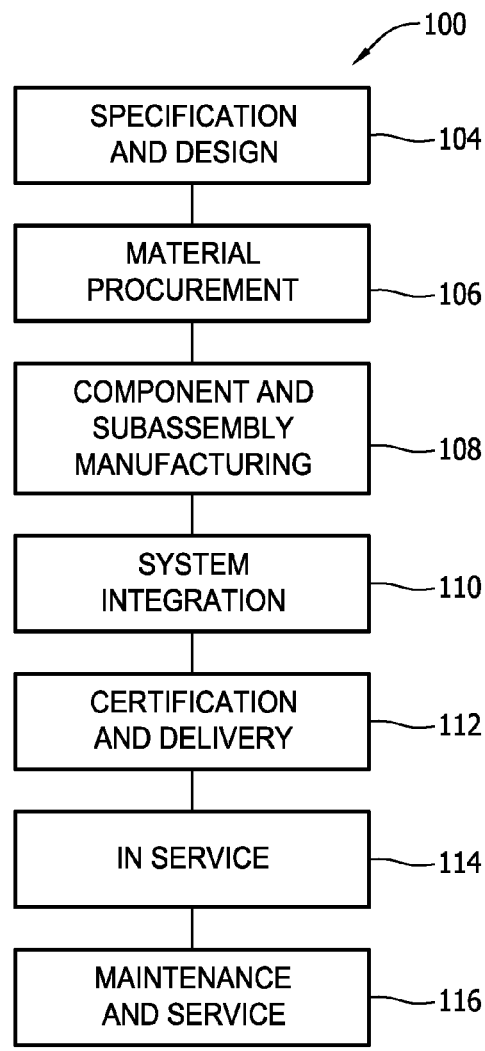
FIG. 1 is a flow diagram of an exemplary aircraft production and service method.
Figure 2:
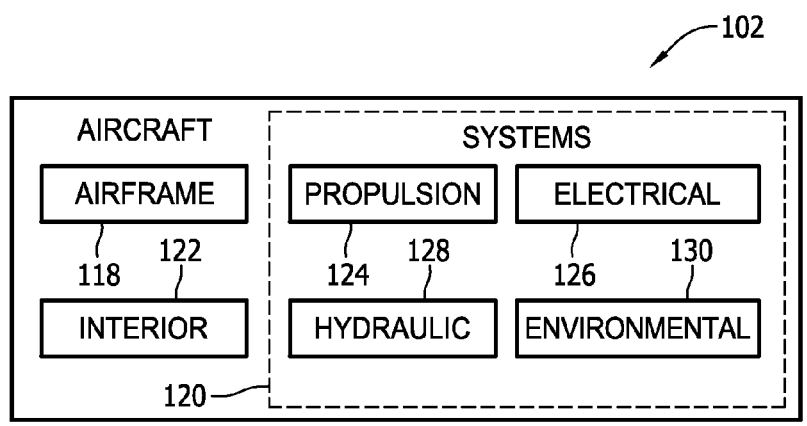
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
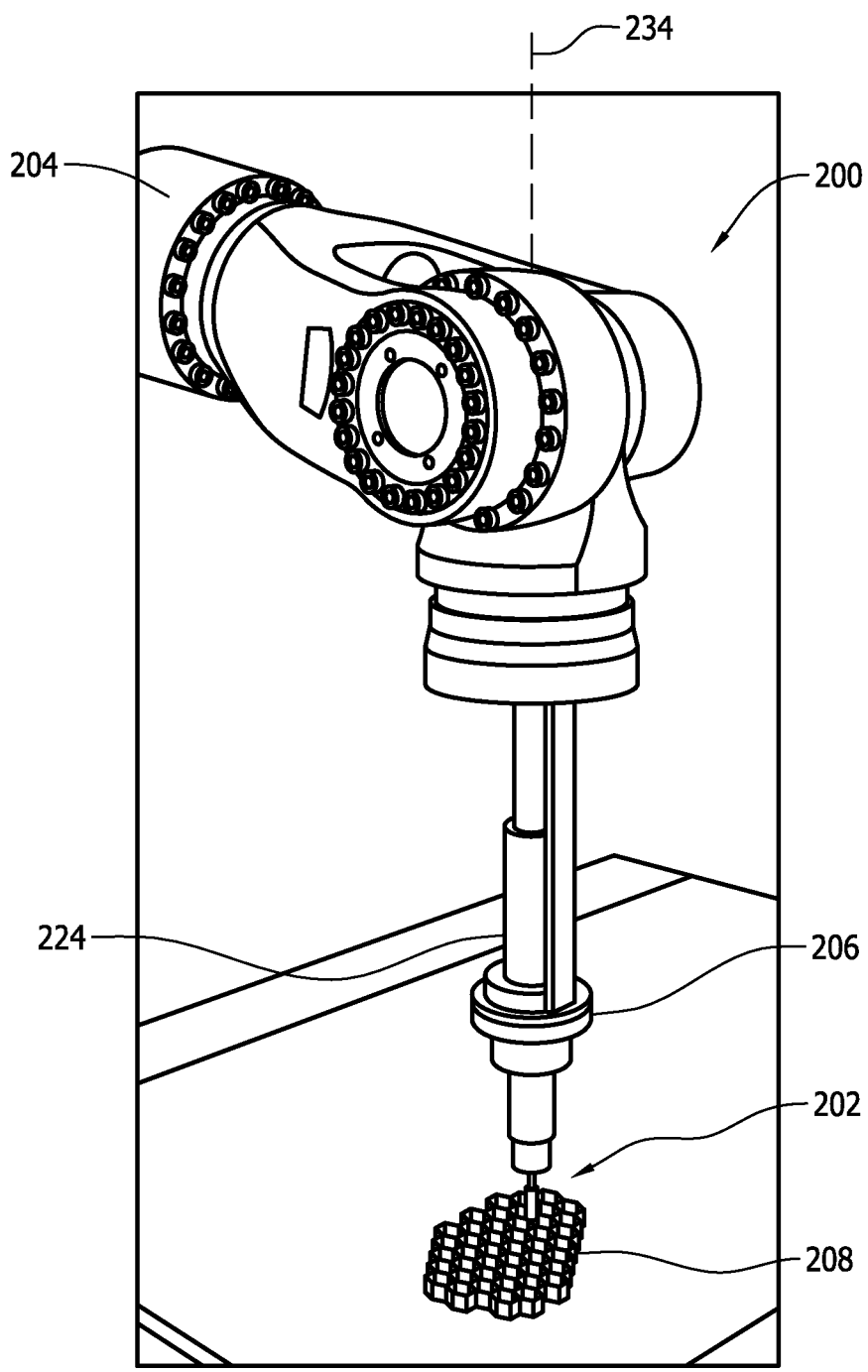
FIG. 3 is a perspective view of an exemplary automated apparatus.
Figure 4:
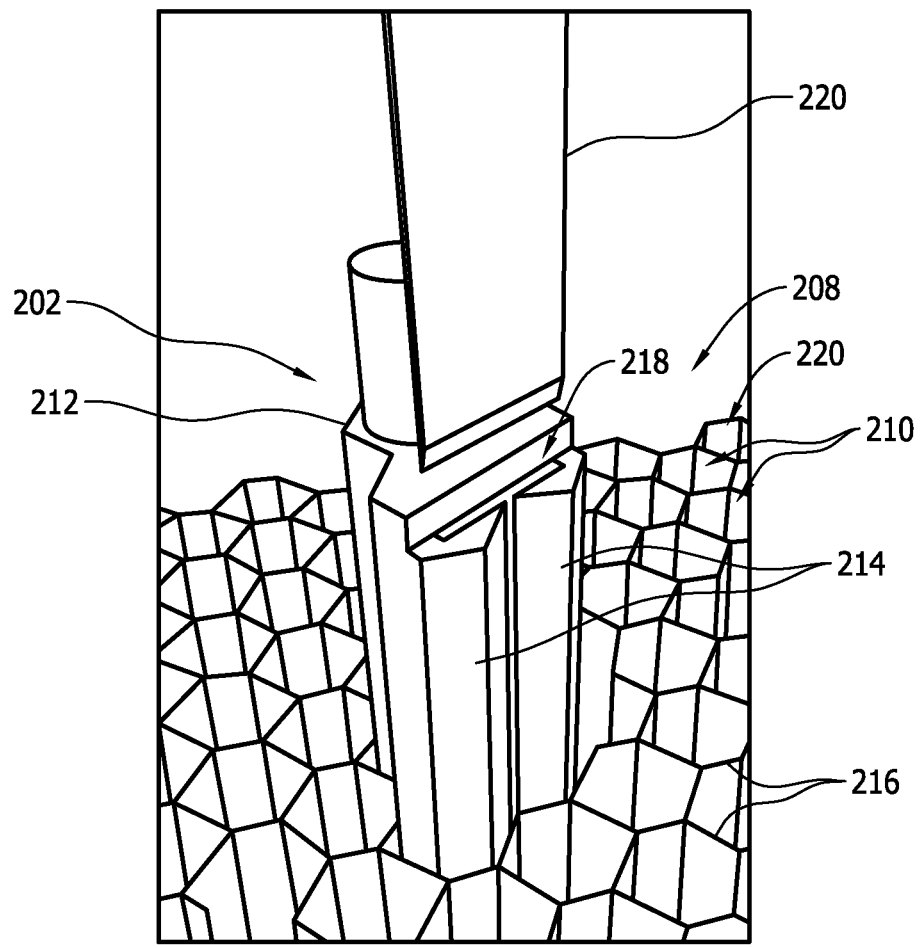
FIG. 4 is an enlarged perspective view of an exemplary cutting tool that may be used with the automated apparatus shown in FIG. 3.

FIG. 3 is a perspective view of an exemplary automated apparatus 200, and FIG. 4 is an enlarged perspective view of an exemplary cutting tool 202 that may be used with automated apparatus 200. In the exemplary implementation, automated apparatus 200 includes a robotic arm 204, an end effector 206 coupled to robotic arm 204, and a cutting tool 202 coupled to end effector 206. Robotic arm 204 and end effector 206 facilitate moving cutting tool 202 relative to a workpiece (not shown), such as a honeycomb core 208. Honeycomb core 208 includes side walls 216 that define a plurality of substantially hexagonal core cells 210. Alternatively, honeycomb core 208 may be fabricated such that core cells 210 have any cross-sectional shape.

Cutting tool 202 includes a guide portion 212 sized for insertion into at least one core cell 210 of honeycomb core 208 with a clearance fit. Specifically, guide portion 212 includes insertion sections 214 that are each sized for insertion into, and that each has a substantially complementary cross-sectional shape as individual core cells 210. Inserting guide portion 212 into core cells 210 facilitates stabilizing cutting tool 202 as side walls 216 of core cells 210 are cut. Guide portion 212 also includes a cutter slot 218 sized to receive a cutter 220 therein. Guide portion 212 facilitates guiding cutter 220 in a substantially normal direction relative to an outer surface 222 of honeycomb core. More specifically, cutter slot 218 extends in a substantially normal direction relative to outer surface 222 such that side walls 216 of core cells 210 are cut in the substantially normal direction. Cutter 220 is slidably coupled with guide portion 212 and, more specifically, is translatable within cutter slot 218 to selectively cut side walls 216. Cutter 220 may be any cutting mechanism that enables cutting tool 202 to function as described herein. An exemplary cutting mechanism includes, but is not limited to, an ultra-sonic cutting mechanism. In an alternative implementation, cutter 220 is coupled directly to end effector 206 such that guide portion 212 may be eliminated.

In the exemplary implementation, automated apparatus 200 includes an adaptive vision system 224 coupled in communication with robotic arm 204 and/or end effector 206. As will be described in more detail below, adaptive vision system 224 acquires data relating to an actual geometry of honeycomb core 208, and directs robotic arm 204 and/or end effector 206 to selectively modify a predetermined tool path (shown in FIGS. 5-7) of cutting tool 202 relative to honeycomb core 208.

Figure 5:
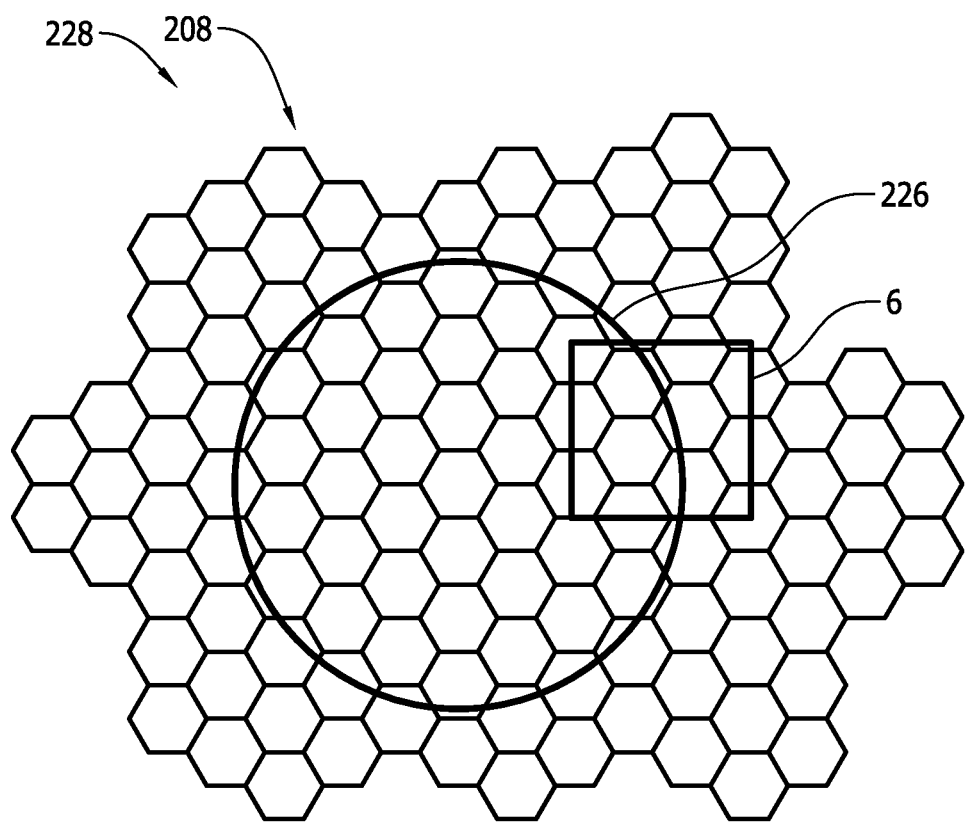
FIG. 5 is a schematic illustration of a honeycomb core.
Figure 6:
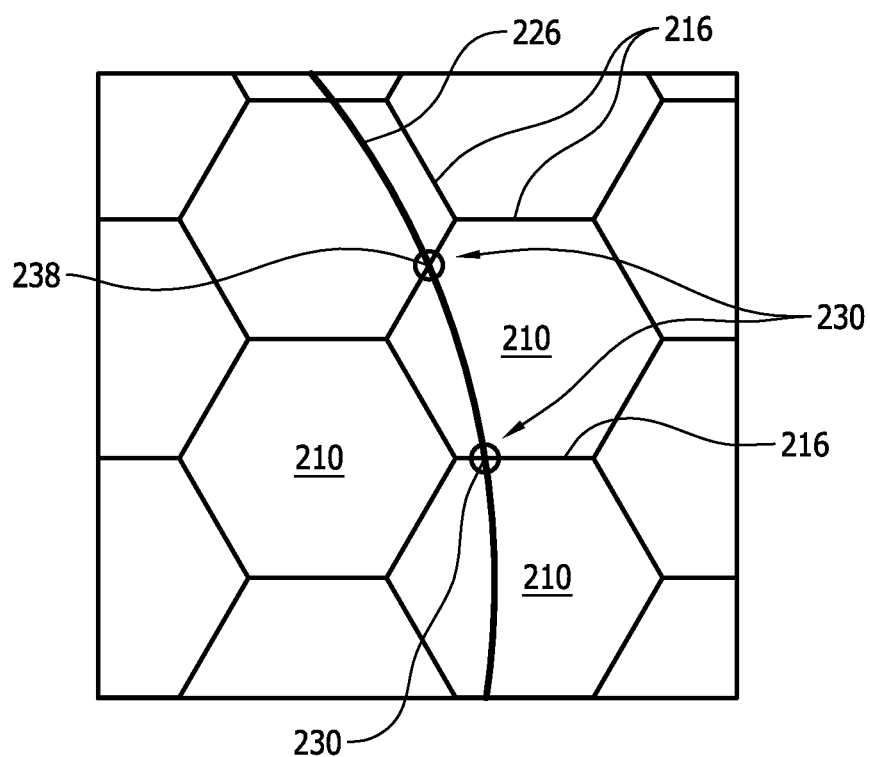
FIG. 6 is a schematic illustration of the honeycomb core shown in FIG. 5 taken along Area 6.
Figure 7:
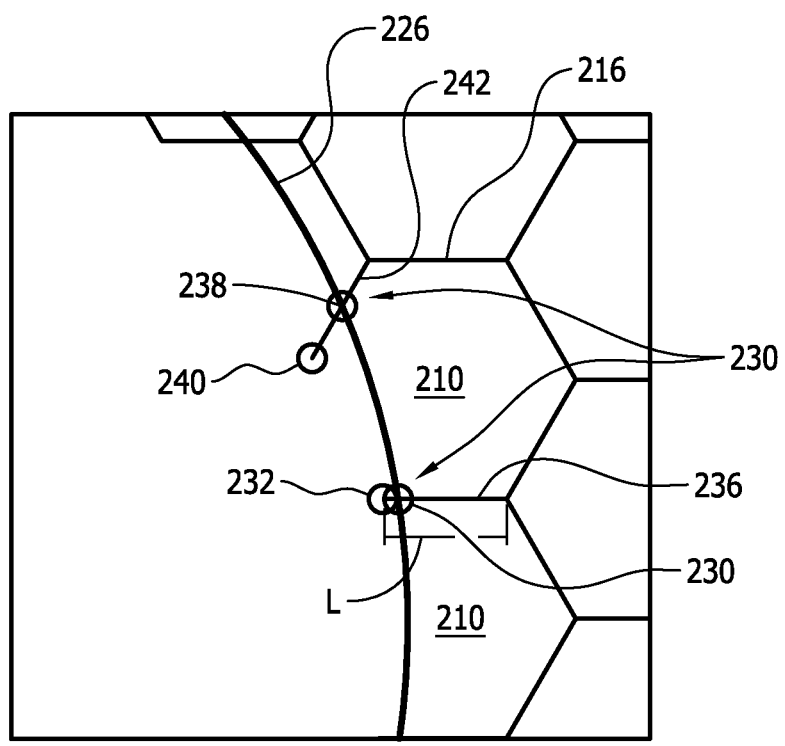
FIG. 7 is a schematic illustration of the honeycomb core shown in FIG. 6 after being selectively cut.

FIG. 5 is a schematic illustration of honeycomb core 208 (shown in FIG. 4), FIG. 6 is a schematic illustration of honeycomb core 208 taken along Area 6, and FIG. 7 is a schematic illustration of honeycomb core 208 after being selectively cut. In the exemplary implementation, a cutting program for automated apparatus 200 (shown in FIG. 3) includes a predetermined tool path 226 for cutting tool 202 (shown in FIG. 4) overlaid on a theoretical and/or schematic geometry 228 of honeycomb core 208. Predetermined tool path 226 is selected to form a predetermined shape in honeycomb core 208. For example, while shown as having a substantially circular shape, predetermined tool path 226 may be selected to form any suitable shape in honeycomb core 208 and/or may be selected to form honeycomb core 208 to have any suitable geometry. Predetermined tool path 226 includes a plurality of initial cutting positions 230 for cutting tool 202 at intersections between predetermined tool path 226 and side walls 216 along predetermined tool path 226.

In operation, the cutting program directs robotic arm 204 and/or end effector 206 to position cutting tool 202 (each shown in FIG. 3) in a first initial cutting position 230 along predetermined tool path 226 based on schematic geometry 228 of honeycomb core 208. Adaptive vision system 224 (shown in FIG. 3) then acquires the actual geometry of honeycomb core 208. Specifically, adaptive vision system 224 facilitates determining a core cell offset (not shown) between schematic geometry 228 and the actual geometry of honeycomb core 208 for core cells 210 adjacent first initial cutting position 230. As such, the cutting program uses the core cell offset to enable end effector 206 to properly orient and/or substantially align cutting tool 202 relative to honeycomb core 208. More specifically, in the exemplary implementation, the core cell offset is used to modify first initial cutting position 230 to position cutting tool 202 in a first final cutting position 232, and to properly orient guide portion 212 as it is inserted into core cells 210. In one implementation, end effector 206 is rotatable about a central axis 234 (shown in FIG. 3) thereof to substantially align guide portion 212 with core cells 210, and to substantially align cutter slot 218 (shown in FIG. 4) with first final cutting position 232. Cutter 220 then translates within cutter slot 218 (both shown in FIG. 4) to cut honeycomb core 208 and to form a first cut side wall 236.

In some implementations, the orientation and/or alignment of cutting tool 202 relative to honeycomb core 208 is also based at least partially on cutting honeycomb core 208 such that first cut side wall 236 has a predetermined length L. Predetermined length L is selected to provide enough surface area of first cut side wall 236 to be effectively coupled to additional honeycomb structures (not shown). For example, in the exemplary implementation, adaptive vision system 224 facilitates modifying first initial cutting position 230 to position cutting tool 202 in first final cutting position 232 such that side walls 216 are cut at an intersection (not shown) of adjoining core cells 210. As such, cutting honeycomb core 208 at first final cutting position 232 facilitates increasing the surface area of cut side wall 236.

Once side wall 216 at first final cutting position 232 has been cut, cutting tool 202 is disengaged from honeycomb core 208 and robotic arm 204 and/or end effector 206 positions cutting tool 202 in a second initial cutting position 238. Adaptive vision system 224 then acquires the actual geometry of honeycomb core 208, the cutting program uses the core cell offset to enable end effector 206 to properly orient and/or substantially align cutting tool 202 relative to honeycomb core 208, and the cutting program uses the core cell offset to modify second initial cutting position 238 to position cutting tool 202 in a second final cutting position 240. Cutter 220 then translates within cutter slot 218 to cut honeycomb core 208 and to form a second cut side wall 242. This process is repeated until the predetermined shape and/or geometry of honeycomb core 208 is obtained.

A method of selectively cutting side walls 216 of honeycomb core 208 is also provided herein. The side walls 216 are selectively cut using automated apparatus 200 that includes cutting tool 202 and adaptive vision system 224. The method includes positioning cutting tool 202 in initial cutting position 230 based on schematic geometry 228 of honeycomb core 208, acquiring an actual geometry of honeycomb core 208 with adaptive vision system 224, and modifying initial cutting position 230 of cutting tool 202 based on the actual geometry of the honeycomb core 208 acquired by adaptive vision system 224.

The method also includes determining a core cell offset between schematic geometry 228 and the actual geometry of honeycomb core 208, and modifying initial cutting position 230 based at least partially on the core cell offset to position cutting tool 202 in final cutting position 232 or 240. Moreover, the method includes inserting guide portion 212 of cutting tool 202 into at least one core cell 210 of honeycomb core 208 with a clearance fit, and translating cutter 220 within cutter slot 218 of guide portion 212 to selectively cut side walls 216. In one implementation, inserting guide portion 212 includes using adaptive vision system 224 to substantially align guide portion with the at least one core cell 210. In another implementation, translating cutter 220 includes translating cutter 220 in a substantially normal direction relative to outer surface 222 of honeycomb core 208.

The implementations described herein relate to an automated apparatus that selectively cuts side walls of a honeycomb core. The automated apparatus includes a cutting tool and an adaptive vision system that facilitates modifying a predetermined tool path of the cutting tool relative to the honeycomb core. More specifically, the adaptive vision system acquires an actual geometry of the honeycomb core, and facilitates modifying the predetermined tool path based on the actual geometry of the honeycomb core. Because side walls of honeycomb cores must be precisely cut to be effectively coupled to additional honeycomb structures, the automated apparatus described herein facilitates selectively cutting the side walls in a more time-efficient and accurate manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automated apparatus for use in selectively cutting side walls of a honeycomb core, said apparatus comprising:
    an end effector;
    a cutting tool coupled to said end effector, wherein said end effector is configured to position said cutting tool in an initial cutting position defined along a predetermined tool path for said cutting tool, the initial cutting position based on a schematic geometry of the honeycomb core; and
    an adaptive vision system configured to direct said end effector to modify the initial cutting position based on an actual geometry of the honeycomb core acquired by said adaptive vision system such that a final cutting position is offset from the predetermined tool path.

2. The apparatus in accordance with claim 1, wherein said end effector is configured to move said cutting tool along a predetermined tool path relative to the honeycomb core, the predetermined tool path including a plurality of initial cutting positions.

3. The apparatus in accordance with claim 1, wherein said adaptive vision system is further configured to:
    determine a core cell offset between the schematic geometry and the actual geometry of the honeycomb core; and
    modify the initial cutting position of the cutting tool based at least partially on the core cell offset, wherein the initial cutting position is modified to position said cutting tool in the final cutting position.

4. The apparatus in accordance with claim 1, wherein said cutting tool comprises:
    a guide portion sized for insertion into at least one core cell of the honeycomb core with a clearance fit; and
    a cutter slidably coupled with said guide portion, wherein said guide portion is configured to guide said cutter in a substantially normal direction relative to an outer surface of the honeycomb core.

5. The apparatus in accordance with claim 4, wherein said adaptive vision system is configured to substantially align said guide portion with the at least one core cell.

6. The apparatus in accordance with claim 4, wherein said guide portion has a substantially complementary cross-sectional shape as the at least one core cell.

7. The apparatus in accordance with claim 4, wherein said end effector is rotatable about a central axis thereof to substantially align said guide portion with the at least one core cell.

8. The apparatus in accordance with claim 1, wherein said cutting tool comprises an ultra-sonic cutting tool.

9. An end effector of an automated apparatus for use in selectively cutting side walls of a honeycomb core, said end effector comprising:
    a cutting tool coupled to said end effector, wherein the end effector is configured to position said cutting tool in an initial cutting position defined along a predetermined tool path for said cutting tool, the initial cutting position based on a schematic geometry of the honeycomb core; and
    an adaptive vision system configured to direct the end effector to modify the initial cutting position based on an actual geometry of the honeycomb core acquired by said adaptive vision system such that a final cutting position is offset from the predetermined tool path.

10. The end effector in accordance with claim 9, wherein said adaptive vision system is further configured to:
   determine a core cell offset between the schematic geometry and the actual geometry of the honeycomb core; and
   modify the initial cutting position of the cutting tool based at least partially on the core cell offset, wherein the initial cutting position is modified to position said cutting tool in the final cutting position.

11. The end effector in accordance with claim 9, wherein said cutting tool comprises:
   a guide portion sized for insertion into at least one core cell of the honeycomb core with a clearance fit; and
   a cutter slidably coupled with said guide portion, wherein said guide portion is configured to guide said cutter in a substantially normal direction relative to an outer surface of the honeycomb core.

12. The end effector in accordance with claim 11, wherein said adaptive vision system is configured to substantially align said guide portion with the at least one core cell.

13. The end effector in accordance with claim 11, wherein said guide portion has a substantially complementary cross-sectional shape as the at least one core cell.

14. The end effector in accordance with claim 11, wherein said end effector is rotatable about a central axis thereof to substantially align said guide portion with the at least one core cell.

15. The end effector in accordance with claim 9, wherein said cutting tool comprises an ultra-sonic cutting tool.

16. A method of selectively cutting side walls of a honeycomb core, the side walls selectively cut using an automated apparatus including a cutting tool and an adaptive vision system, said method comprising:
   positioning the cutting tool in an initial cutting position defined along a predetermined tool path, the initial cutting position for the cutting tool, the initial cutting position based on a schematic geometry of the honeycomb core;
   acquiring an actual geometry of the honeycomb core with the adaptive vision system; and
   modifying the initial cutting position of the cutting tool based on the actual geometry of the honeycomb core acquired by the adaptive vision system such that a final cutting position is offset from the predetermined tool path.

17. The method in accordance with claim 16 further comprising:
   determining a core cell offset between the schematic geometry and the actual geometry of the honeycomb core; and
   modifying the initial cutting position based at least partially on the core cell offset to position the cutting tool in the final cutting position.

18. The method in accordance with claim 16 further comprising:
   inserting a guide portion of the cutting tool into at least one core cell of the honeycomb core with a clearance fit; and
   translating a cutter within a cutter slot of the guide portion to selectively cut the side walls.

19. The method in accordance with claim 18, wherein inserting a guide portion comprises using the adaptive vision system to substantially align the guide portion with the at least one core cell.

20. The method in accordance with claim 18, wherein translating a cutter comprises translating the cutter in a substantially normal direction relative to an outer surface of the honeycomb core.

* * * * *